United States Patent
Tasto

(10) Patent No.: US 6,792,298 B1
(45) Date of Patent: Sep. 14, 2004

(54) TELEPHONE TERMINAL TO CONTROL FUNCTIONS AND ENTER DIGITS

(75) Inventor: Manfred Tasto, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,728

(22) PCT Filed: Apr. 12, 2000

(86) PCT No.: PCT/DE00/01124

§ 371 (c)(1),
(2), (4) Date: Nov. 5, 2001

(87) PCT Pub. No.: WO00/69153

PCT Pub. Date: Nov. 16, 2000

(30) Foreign Application Priority Data

May 5, 1999 (DE) .......................... 199 20 743

(51) Int. Cl.[7] ................................. H04Q 7/32
(52) U.S. Cl. .................... 455/575.8; 455/557; 455/564; 379/368; 379/433.07; 379/370
(58) Field of Search ......................... 455/575.8, 575.5, 455/575.3, 575.4, 565, 557, 566, 550.1; 379/368, 433.07, 355.01, 419, 370, 450, 456, 442, 433.06, 433.11

(56) References Cited

U.S. PATENT DOCUMENTS 5,140,632 A * 8/1992 Anten .................... 455/557 X
5,335,273 A * 8/1994 Takagi et al. ........ 379/433.01 X
5,365,570 A * 11/1994 Boubelik ................ 379/370 X
5,646,649 A * 7/1997 Iwata et al. .......... 455/575.8 X
5,924,044 A * 7/1999 Vannatta et al. .... 379/433.11 X

FOREIGN PATENT DOCUMENTS

| DE | 295 01 044.4 | 6/1995 |
| DE | 295 06 538 U1 | 8/1995 |
| DE | 297 06 223 U1 | 8/1997 |
| DE | 298 09 825 U1 | 10/1998 |
| EP | 0 354 367 A2 | 2/1990 |
| GB | 2 321 823 A | 8/1998 |
| WO | WO 98/10571 | 3/1998 |
| WO | WO 98/40995 | 9/1998 |

* cited by examiner

*Primary Examiner*—Nay Maung
*Assistant Examiner*—Philip J. Sobutka
(74) *Attorney, Agent, or Firm*—Morrison & Foerster LLP

(57) ABSTRACT

Telephone terminal, in particular a mobile telephone having a housing and having a first input device for controlling all the implemented functions and for entering the digits of telephone numbers, having a second input device which is held in a snap-on module, can be fitted to the housing and, when in the fitted state, at least partially covers the first input device, for speed-dialing input for at least one predetermined telephone number.

8 Claims, 2 Drawing Sheets

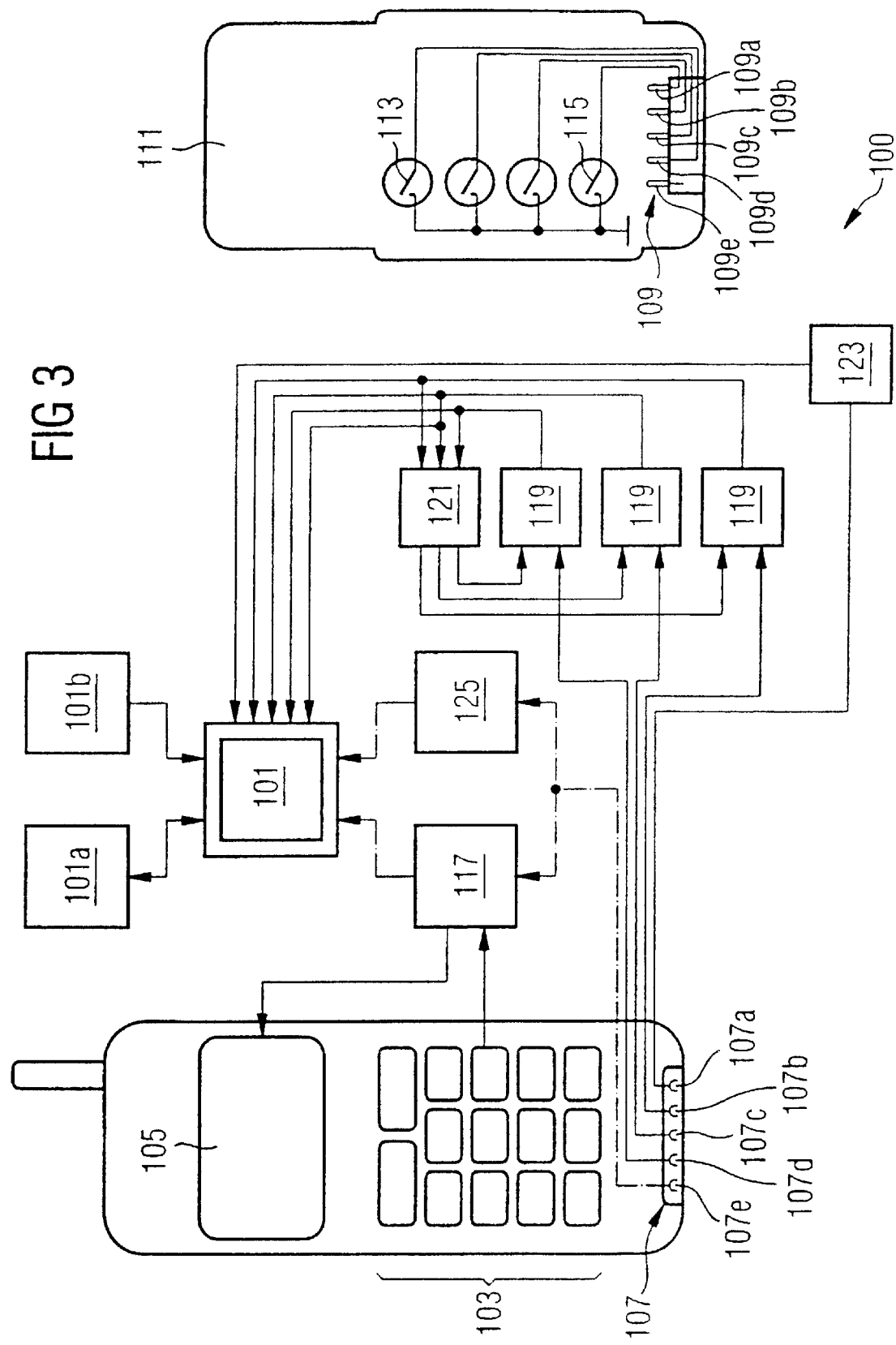

TELEPHONE TERMINAL TO CONTROL FUNCTIONS AND ENTER DIGITS

CLAIM FOR PRIORITY

This application claims priority to International Application No. PCT/DE00/01124 which was published in the German language on Apr. 12, 2000.

TECHNICAL FIELD OF THE INVENTION

The invention relates to a telephone terminal, and in particular, to a mobile telephone to control functions and enter digits.

BACKGROUND OF THE INVENTION

The telephone, and in recent years increasingly the mobile telephone, has become a virtually indispensable communication means in everyday life. It makes it possible to contact private and business contacts, to make use of services, to order goods and to request help in emergency situations, etc., over any desired distances. The particular advantage of the mobile telephone is that it also offers these capabilities from virtually any desired point in the developed industrial nations. That is, even while traveling to work or to school, or while on journeys, one can communicate. For children and the elderly, whose mobility is restricted and who in some circumstances in daily life are comparatively dependent on assistance, these capabilities are particularly worthwhile—especially from the view pint of safety.

However, the elderly and small children generally have problems with operating a conventional telephone, particularly with operating a mobile telephone, which normally uses menu guidance requiring a sequence of interactive control and perception processes. People with very poor sight or who cannot read cannot operate a normal mobile telephone at all. Thus, even though the capabilities of mobile telephones are particularly valuable to them, people such as these are largely prevented from using these capabilities.

The relatively complicated operation of modern telephones, in particular of mobile telephones, is a more or less necessary consequence of their necessary consequence of their comprehensive functionality, which is based on users who have major demands.

The requirements of the elderly or small children for a telephone terminal are extremely simple in comparison. Generally, they contact only a small number of people (parents, neighbors, doctor, police, etc.) and additional functions are of virtually no or little value. Thus, they do not require a display and do not require a normal digit or function keypad to operate the telephone. The components of a normal modern telephone terminal result in people making incorrect selections, and often make it impossible for them to make the desired calls. However, on the other hand, the user interface of such appliances is matched to the presence and the use of the display and of the function keypad such that even simple, indispensable control processes—such as the activation of a mobile telephone by entering the PIN, speed dialing, call acceptance and call termination etc.—depend on the use of the function keypad, and of the display.

A keypad adapter, which is plugged onto the actual keypad of the mobile telephone, is known from WO 98/10571. Further keys, which form a second keypad, are located on this keypad adapter. The keys on this second keypad are physically arranged such that the first keypad of the mobile telephone, located underneath, can be operated by the second keypad. Since the specified group of people most of the time operate only selected keys on the mobile radio telephone keypad, these keys are designed to be larger on the second keypad. It is thus simpler for the physically disabled to operate the keys, which are now larger.

In one embodiment of the invention, there is a telephone terminal. The terminal includes, for example, a housing and a first input device to control the functions and enter digits of telephone numbers, and a second input device which is held in a snap-on module and configured to be fit to the housing, the second input device at least partially covering the first input device when fitted, wherein contact between the mobile telephone and the snap-on module is by a connector strip as part of a standardized plug connection, and the plug connection has an identification contact to switch the controller from the first to the second input device.

In another aspect of the invention, the telephone terminal is a mobile telephone and has an input element for call acceptance and call termination.

In another aspect of the invention, the plug connection has an identification contact via which the snap-on module is detected, and the telephone terminal is switched to be controlled by the second input device, and the first input device is switched off.

In still another aspect of the invention, terminal has an off switch, which is connected to the identification contact, and via which the telephone terminal is switched off when the snap-on module is removed.

In another aspect of the invention, the second input device has a number of speed-dialing keys and an associated dialing sequence control device to carry out a sequence of predetermined dialing processes automatically.

In another aspect of the invention, the terminal has a locking device for childproof locking of the snap-on module to the housing.

In yet another aspect of the invention, the snap-on module covers the top face of the housing, leaving the loudspeaker and microphone areas free.

In another aspect of the invention, the snap-on module has a lighting device to illuminate the second input device.

BRIEF DESCRIPTION OF THE DRAWINGS

The following description can be read with reference to the figures, in which:

FIG. 3 shows a functional block diagram of a mobile telephone equipped with a snap-on module according to one embodiment of the invention.

DETAILED DESCRIPTION OF THE PREFERRED EMBODIMENTS

Figure 1:
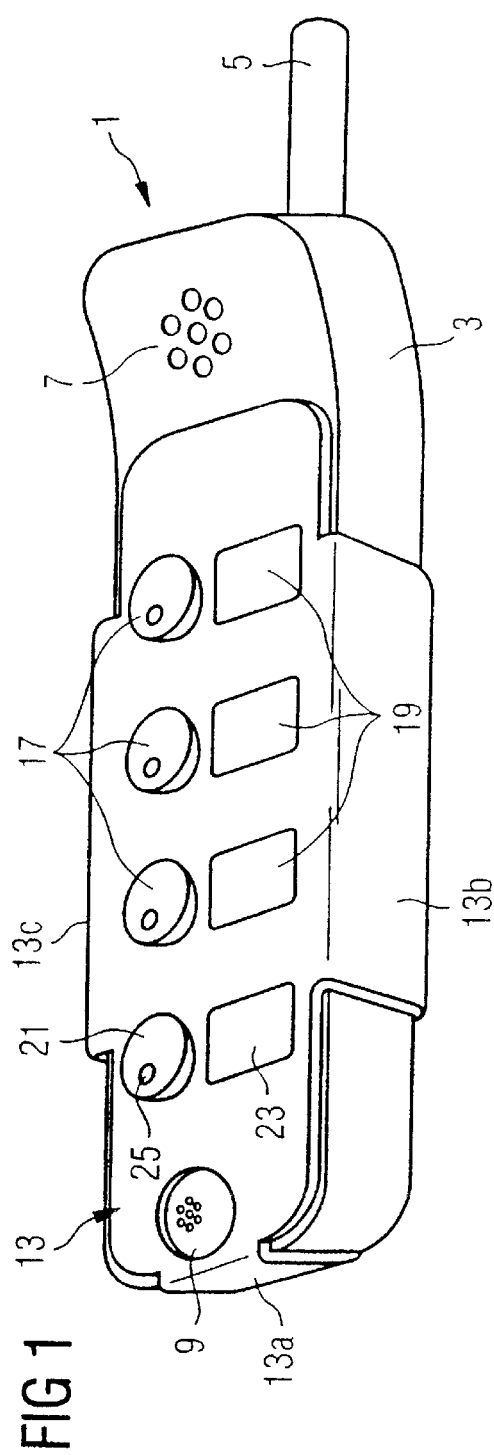
FIG. 1 shows an oblique view of a mobile telephone with a snap-on module fitted thereto.

The invention discloses a telephone terminal which is matched to the needs, for example, of the elderly and children, and can not only be operated easily and safely, but also offers simplified user guidance.

The invention includes an additional user interface and input device as a modular add-on device to the conventional user interface and corresponding input device, and which is matched to the capabilities and operating skills of children and the elderly. It also includes an additional input device virtually as a replacement for the normal input device when the telephone terminal is being used. The normal input device of a correspondingly equipped telephone terminal is covered, and hence makes it inaccessible. This virtually precludes irritation and incorrect selections, and reduces the hindrance threshold preventing people from using a modern telephone terminal.

In one preferred embodiment, the additional input device contains control elements required to set up and terminate a small number of predetermined calls, namely one or more speed-dialing key(s) and an on/off key for call acceptance/call termination. (An on/off key is, of course, required only for a mobile telephone or cordless telephone, but not for a line-connected telephone terminal.)

Other control processes, such as authentication by entering a PIN when switching on a mobile telephone (which is specified requirement in the mobile radio standards) and the programming of the speed-dialing keys are carried out by other persons, using the conventional first input device, who have the necessary skills and knowledge to do this, for example either of the parents of said children or grown-up children, caregivers or acquaintances of the elderly. The invention thus solves the problem of the need to provide a complex user interface for comprehensive operation and programming of the telephone terminal, and of providing a simple user interface, which can be handled without any problems, by a group of users with restricted skills.

The invention is advantageous from the cost point of view because it represents a retrofit to mass-produced (and hence cheaply produced) telephone terminals, does not increase the cost of mass production, and results in additional costs for the "simple user interface" for the actual users (or their families).

The second input device, which is accommodated in a snap-on module, preferably has a connector strip as part of a standardized plug connection between the telephone housing and the snap-on module. This connector strip can, for example, be matched to the standard socket for connection of a laptop computer to better quality mobile telephones. The plug connection preferably has an identification contact, which is used in the telephone to detect the fact that the snap-on module is fitted. This identification contact makes it possible to switch the control or operation from the first input device to the second (snapped-on) input device. Since, in the preferred embodiment, the first input device is then entirely switched off, there is virtually no possibility of any conflicts between the input devices, incorrect selections or mechanical manipulations.

In another embodiment, in particular for a mobile telephone, an off switch is connected to the identification contact, via which the telephone is switched off when a snap-on module is removed from the telephone housing again after having been fitted. The mobile telephone is then switched off and cannot be used again until after reactivation, including an authentication process (entering a PIN code). Thus, if the user loses the mobile telephone with the snap-on module fitted, or it is taken from him by force, then a new user (finder or thief) can admittedly dial the preprogrammed speed-dialing numbers. This embodiment therefore provides effective anti-theft protection.

The second input device, which is located in the snap-on module, preferably has a number of speed-dialing keys which, in a further embodiment, has an associated dialing sequence control device for carrying out a sequence of predetermined dialing processes automatically. This dialing sequence control device may be in the form of software, by suitable programming of the mobile telephone. This function provides additional safety for emergency situations since it allows even a largely helpless user to reach at least one of a number of important contacts, without having to think about a sequence of control processes, and to have to carry them out.

Since individuals using the invention have restricted perception capabilities, the input elements on the second input device are preferably larger than the conventional keys on modern telephone terminals, and/or are provided using primary colors and/or with embossed symbols or clear inscriptions, in order to simplify operation and to prevent errors.

The input elements (in particular keys) may have associated lighting means, which ensure reliable operation even in poor lighting conditions. If they are in the form of separate, active light sources on the snap-on module, these lighting means may optionally have an associated on/off switch, in order to extend the standby time. In principle, the lighting device may also be in the form of a light conducting device, which uses an illumination function of the basic appliance (in particular its display lighting).

In an embodiment which is particularly suitable for children, locking means are provided to lock the snap-on module to the housing in a childproof manner. A correspondingly equipped telephone terminal is then largely protected even against intentional manipulations by children to remove the snap-on module.

The actual telephone keypad (of the first input device) and the display area can be protected well against accidental or deliberate damage by designing the snap-on module such that it covers the top face of the telephone housing, leaving the microphone and loudspeaker area free, particularly in the case of a mobile telephone or cordless telephone.

Figure 2:
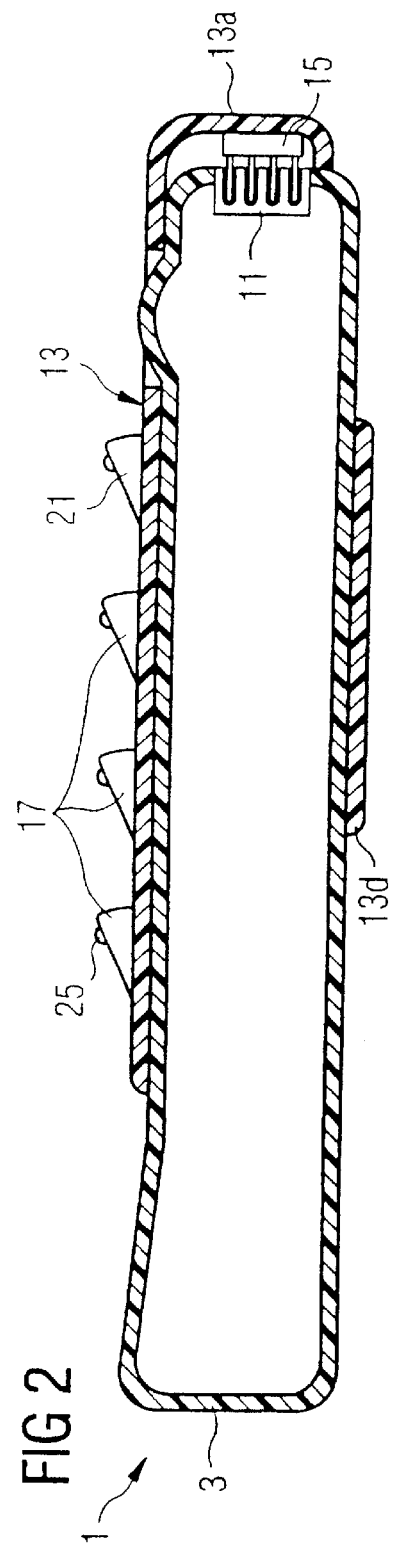
FIG. 2 shows a cross-sectional illustration of the housing and of the snap-on module for the mobile telephone as shown in FIG. 1.

FIG. 1 shows an oblique view of a mobile telephone with a snap-on module fitted to it, illustrated in the form of a sketch, FIG. 2 shows a cross-sectional illustration, likewise in the form of a sketch, of the housing and of the snap-on module for the mobile telephone as shown in FIG. 1, and FIG. 3 shows a functional block diagram of a mobile telephone equipped with a snap-on module, according to one embodiment of the invention.

A mobile telephone 1 has a plastic housing 3 from which an antenna 5 projects and into which apertures are incorporated to form a loudspeaker area 7 and a microphone area 9, as well as a recess for holding a connecting socket 11.

FIGS. 1 and 2 show, a snap-on module 13 fitted to the mobile telephone 1—covering the keypad and display—such that it is electrically connected to the mobile telephone 1 via a connector strip 15 which is located on an end-face side region 13a and is designed to match the connecting socket 11.

In addition to the end-face side region 13a, two side regions 13b, 13c originate from the base surface of the snap-on module 13, extending approximately at right angles to the base surface. A bottom part 13d which originates from the side region 13b extends under a section of the housing lower face of the housing 3. The entire shell of the snap-on module is preferably made from plastic such that its shape is elastic so that the snap-on module forms a part which can be clipped onto the mobile telephone housing 3. The clipping requires a certain amount of finger skill, owing to the specific arrangement of the end-face side region 13a, the side regions 13b, 13c and the bottom region 13d, as does pulling it off from the housing 3. Hence, the side pieces 13b, 13c and the bottom part of 13d also act as a childproof locking means. However, this embodiment represents only one of a number of possible embodiments, in which case simple key-operating/latching mechanisms may also be used as locking means, such as those which are known from childproof container caps or from the field of domestic equipment.

The base section of the snap-on module, which covers the keypad and the display of the mobile telephone 1, has three large circular speed-dialing keys 17, each of which has an associated symbol or inscription area 19, as well as an on/off key 21 for call acceptance and call termination (which is likewise illustrated in the form of a circle in the figure but is of a different color to the speed-dialing keys in this embodiment). This key also has an associated symbol area 23. The control keys 17, 21 project a relatively long distance from the surface of the snap-on module 13, so that they can be sensed by touch, and have a greater key movement than conventional mobile telephone keys in order to provide the user with reliable feedback that the key has been operated. In the simple embodiment shown in FIGS. 1 and 2, the keypad functions of the keypad 17, 21 can be provided by simple switching contacts, which are connected to the connector strip 15 via separate leads.

FIG. 3 shows one embodiment of the electronic implementation of the arrangement whose mechanical construction is sketched in FIGS. 1 and 2, in the form of a block diagram of a mobile telephone.

In another embodiment, a mobile telephone 100 has a microprocessor 101 with an associated main memory 101a and a program memory 101b as the central processing and control device, an input keypad 103 to control and dial digits, a display device 105 to display dialed digits and information as well as menu guidance, and a connecting socket 107 for connection of an external data input device. The logics and radio section of the mobile telephone is not shown in FIG. 3.

In order to make it easier to reliably find the input keys 17, 21 when it is dark, each of them has an LED 25 integrated in it, which is supplied with power from the mobile telephone 1 via the plug connection 11, 15. FIG. 3 shows one embodiment of the electronic implementation of the arrangement whose mechanical construction is sketched in FIGS. 1 and 2, in the form of a functional block diagram of a mobile telephone, illustrating only those components which are essential to the implementation of the invention.

In a manner known per se, a mobile telephone 100 has a microprocessor 101 with an associated main memory 101a and a program memory 101b as the central processing and control device, an input keypad 103 for functional control and the dialing of digits, a display device 105 to display dialed digits and information as well as menu guidance, and a connecting socket 107 for connection of an external data input device. The logics and radio section of the mobile telephone is irrelevant to the implementation of the invention and is thus not shown in FIG. 3, nor is it explained here.

The connecting socket 107 has contacts 107a to 107e, which correspond to plug contacts 109a to 109e in a plug 109 on a snap-on module 111. The snap-on module 111 has three speed-dialing keys 113 and an on/off key 115 for call acceptance and call termination, and these are associated with the plug contacts 109b to 109d, and 109a, respectively.

Technically, the function of the keys—which represent the simplest, but not necessarily the only form, for implementation of the input element—can be achieved by providing one switching contact for each key. If a greater number of speed-dialing keys are provided, then a keypad switching matrix can also be used in order to restrict the number of leads. Finally, it is also possible to use an input device in the form of an "intelligent keypad", in which the snap-on module has a microcontroller, which converts the switching information from the individual keys to sequential signal sequences (bit sequences), and results in a reduction in the number of contacts.

The additional plug contact 109e is used (interacting with the corresponding socket contact 107e) as an identification contact to detect whether the snap-on module 111 has been fitted to the mobile telephone 100. If this is the case, then the plug contact 109e actuates a switching stage 117 in the mobile part, which interrupts the connection of the input keypad 103 and of the display 105 to the control device 101. At the same time, when the snap-on module 111 is fitted, speed-dialing memory areas 119 are allocated to the speed-dialing keys 113, are addressed by operation of one of the speed-dialing keys. That is, by closing the associated contact, and, via the microprocessor 101 and the logic section (which is not illustrated), cause a call to be output to a connection subscriber using the telephone number specified in advance in the memory areas 119.

The memory areas 119 also have an associated dialing sequence control device 121 via which, if one of the speed-dialing keys is operated unsuccessfully (that is to say the corresponding call subscriber cannot be reached) sequential addressing of the other memory areas is initiated until one of the calls is acknowledged. When the snap-on module 111 is fitted, the call acceptance/call termination key 115 is also allocated to a corresponding control area 123 in the microprocessor, and appears instead of the corresponding key of the deactivated keypad 103. A switching-off stage 125, which is likewise connected to the plug connection 107e, 109e, switches the appliance off completely when the snap-on module is detached from the mobile telephone.

The additional plug contact 109e is used (interacting with the corresponding socket contact 107e) as an identification contact to detect whether the snap-on module 111 has been fitted to the mobile telephone 100. If this is the case, then the plug contact 109e actuates a switching stage 117 in the mobile part, which interrupts the connection of the input keypad 103 and of the display 105 to the control device 101. At the same time, when the snap-on module 111 is fitted, speed-dialing memory areas 119 are allocated to the speed-dialing keys 113, are addressed by operation of one of the speed-dialing keys. That is, by closing the associated contact, and, via the microprocessor 101 and the logic section (which is not illustrated), cause a call to be output to a connection subscriber using the telephone number specified in advance in the memory areas 119.

When the mobile telephone 100 is brought into use (without the snap-on module being fitted), it is activated in the normal manner by entering a PIN code using the input keypad 103. This may be done, for example, by the parents of a child using the mobile telephone or a carer for someone who is frail and elderly. The speed-dialing memory 119 is then programmed, likewise using the input keypad 103, and using the normal user interface (menu control). In this case, a telephone number is programmed for each of the speed-dialing keys 113. Once this has been done, the snap-on module 111 is fitted. The mobile telephone uses the identification contact that has been mentioned to identify the fact that the snap-on module has been fitted, and can now be operated via the keys 113, 115 on the snap-on module, once the keypad 103 has been deactivated, as mentioned. The mobile telephone is thus ready to operate using the simple user interface. Since the snap-on module leaves the charging socket free, the rechargeable battery can be charged as before. Since the input keypad 103 is concealed and deactivated, it is, however, neither possible to switch the appliance off nor to enter the PIN once again. This largely prevents incorrect selections. As has already been mentioned further above, the switching-off stage 125 ensures that the mobile telephone is switched off when the snap-on module is removed, and cannot be misused.

The embodiment of the invention is not restricted to the described examples but is also feasible in a large number of modifications for other appliances and applications. For example, in the case of the "intelligent" keypad mentioned further above, the "identification contact" can be replaced by a specific signal code.

What is claimed is:

1. A telephone terminal, comprising:

a housing and a first input device to control the functions and enter digits of telephone numbers; and a second input device which is held in a snap-on module and configured to be fit to the housing, the second input device at least partially covering the first input device when fitted, wherein contact between the mobile telephone and the snap-on module is by a connector strip as part of a standardized plug connection, and the plug connection has an identification contact to switch the controller from the first to the second input device.

2. The telephone terminal as claimed in claim 1, wherein the telephone terminal is a mobile telephone and has an input element for call acceptance and call termination.

3. The telephone terminal as claimed in claim 1, wherein the second input device has a number of speed-dialing keys and an associated dialing sequence control device to carry out a sequence of predetermined dialing processes automatically.

4. The telephone terminal as claimed in claim 1, further comprising a locking device for childproof locking of the snap-on module to the housing.

5. The telephone terminal as claimed in claim 1, the snap-on module covers the top face of the housing, leaving the loudspeaker and microphone areas free.

6. The telephone terminal as claimed in claim 1, wherein the snap-on module has a lighting device to illuminate the second input device.

7. The telephone terminal as claimed in claim 1, wherein the plug connection has an identification contact via which the snap-on module is detected, and the telephone terminal is switched to be controlled by the second input device, and the first input device is switched off.

8. The telephone terminal as claimed in claim 7, further comprising:

an off switch, which is connected to the identification contact, and via which the telephone terminal is switched off when the snap-on module is removed.

\* \* \* \* \*